(12) United States Patent
He et al.

(10) Patent No.: US 11,926,015 B2
(45) Date of Patent: Mar. 12, 2024

(54) MAGNETORHEOLOGICAL INTELLIGENT FIXTURE FOR GRINDING

(71) Applicant: ZHEJIANG NORMAL UNIVERSITY, Jinhua (CN)

(72) Inventors: Xinsheng He, Jinhua (CN); Lanpeng Zheng, Jinhua (CN); Jiajie Jiang, Jinhua (CN); Chongqiu Zhou, Jinhua (CN); Chunfu Gao, Jinhua (CN); Dongyun Wang, Jinhua (CN); Shiju E, Jinhua (CN)

(73) Assignee: ZHEJIANG NORMAL UNIVERSITY, Jinhua (CN)

( * ) Notice: Subject to any disclaimer, the term of this patent is extended or adjusted under 35 U.S.C. 154(b) by 380 days.

(21) Appl. No.: 17/438,422

(22) PCT Filed: Mar. 17, 2021

(86) PCT No.: PCT/CN2021/081257
§ 371 (c)(1),
(2) Date: Sep. 11, 2021

(87) PCT Pub. No.: WO2021/185268
PCT Pub. Date: Sep. 23, 2021

(65) Prior Publication Data
US 2022/0305614 A1  Sep. 29, 2022

(30) Foreign Application Priority Data
Mar. 18, 2020 (CN) .......................... 202010191693.2

(51) Int. Cl.
B24B 37/27 (2012.01)
B23Q 1/38 (2006.01)
B24B 49/16 (2006.01)

(52) U.S. Cl.
CPC .............. B24B 37/27 (2013.01); B24B 49/16 (2013.01); B23Q 1/38 (2013.01)

(58) Field of Classification Search
None
See application file for complete search history.

(56) References Cited

FOREIGN PATENT DOCUMENTS

CN    108297162 A   *  7/2018
CN    108297162 A      7/2018
(Continued)

OTHER PUBLICATIONS

CN-108297162-A translation (Year: 2018).*
(Continued)

*Primary Examiner* — Abbie E Quann
(74) *Attorney, Agent, or Firm* — Pilloff Passino & Cosenza LLP; Sean A. Passino; Rachel K. Pilloff

(57) ABSTRACT

Disclosed is a magnetorheological intelligent fixture for grinding, including a container (1), a water bladder (2), a pressure transmitter (4), a water pump (15), a first electromagnet (8), a controller (10), and an elastic telescopic rod. The elastic telescopic rod is disposed at a bottom of the container (1). Each side wall of the container (1) is provided with the water bladder (2). The water bladders (2) are mutually communicated. The water bladders (2) are respectively communicated with the pressure transmitter (14) and the water pump (15) respectively. The water pump (15) is connected to the water tank (6). A workpiece to be clamped is disposed at a top of the elastic telescopic rod. The container (1) is disposed above the first electromagnet (18). The first electromagnet (8), the pressure transmitter (4), and the water pump (15) are all electrically connected to the controller (10).

10 Claims, 2 Drawing Sheets

(56) References Cited

FOREIGN PATENT DOCUMENTS

| | | |
|---|---|---|
| CN | 110614521 A | 12/2019 |
| CN | 110640499 A | 1/2020 |
| CN | 111230732 A | 6/2020 |
| DE | 10248204 A1 | 5/2004 |

OTHER PUBLICATIONS

Office Action for related Japan application 202010191693.2, dated Sep. 30, 2020.
Office Action for related Japan application 202010191693.2, dated Dec. 22, 2021.
International Search Report for PCT/CN2021/081257, dated Jun. 16, 2021.

* cited by examiner

MAGNETORHEOLOGICAL INTELLIGENT FIXTURE FOR GRINDING

CROSS REFERENCE TO RELATED APPLICATION(S)

This patent application claims the priority of Chinese Patent Application No. 202010191693.2 filed with China National Intellectual Property Administration on Mar. 18, 2020, entitled "a magnetorheological intelligent fixture for grinding," the disclosure of which is incorporated by reference herein in its entirety.

TECHNICAL FIELD

The present disclosure relates to the field of grinding, and in particular relates to a magnetorheological intelligent fixture for grinding.

BACKGROUND ART

Free-form surface workpieces need to be fixed and positioned with fixtures for grinding. Since there are a great variety of workpieces and surface types, designing a special fixture for each type of workpieces will lead to high cost and low efficiency and bring great inconvenience for the grinding. Therefore, there is a need for a universal grinding fixture.

When grinding a workpiece, a clamping force of the fixture has a greater impact on processing quality. With a small clamping force, the workpiece is easy to loosen, causing accurate positioning. With a large clamping force, the workpiece is easy to deform. In addition, as for most of the traditional magnetorheological fixtures, a magnetorheological fluid is placed inside a clamping joint to form a flexible clamping unit to clamp the workpiece, but it will still cause some damage to the surface of the workpiece. Therefore, in order to control the clamping force, an intelligent fixture that can measure the clamping force is needed to prevent the workpiece from loosening and deforming when being clamped.

SUMMARY

Based on this, it is necessary to provide a magnetorheological intelligent fixture for grinding, which can not only control a clamping force and ensure that the workpiece is not loosened or deformed, but also can be applied to various surface types.

In order to achieve the forgoing objective, the present disclosure provides the following technical solution:

Disclosed is a magnetorheological intelligent fixture for grinding, including: a container, a water bladder, a pressure transmitter, a water pump, a first electromagnet, a controller, and an elastic telescopic rod.

The container contains a first magnetorheological fluid; the elastic telescopic rod is disposed at a bottom of the container, each side wall of the container is provided with the water bladder, the water bladders are mutually communicated, the water bladders are respectively communicated with the pressure transmitter and the water pump, and the water pump is connected to the water tank; a workpiece to be clamped is disposed on a top of the elastic telescopic rod; the container is disposed above the first electromagnet; the first electromagnet, the pressure transmitter, and the water pump are all electrically connected to the controller; and the elastic telescopic rod is configured to position and support the workpiece to be clamped, the controller is configured to control the water pump to pressurize the water bladder to pre-clamp the workpiece to be clamped, the pressure transmitter is configured to measure a clamping force of the water bladder to the workpiece to be clamped and transmit the clamping force to the controller, and the controller is also configured to control the first electromagnet to be energized according to the clamping force to solidify the first magnetorheological fluid to clamp the workpiece to be clamped.

Optionally, the elastic telescopic rod includes: a telescopic rod housing, a second electromagnet, a sliding rod, and a displacement sensor; the sliding rod is disposed at a bottom end of the container; the workpiece to be clamped is disposed at a top end of the telescopic rod housing; the telescopic rod housing is disposed at a top end of the sliding rod, the telescopic rod housing and the sliding rod form a closed space, a second magnetorheological fluid is provided in the closed space, the telescopic rod housing can slide up and down through the sliding rod, and the workpiece to be clamped will slide along with telescopic rod housing; and the second electromagnet and the displacement sensor are both disposed on the telescopic rod housing, the second electromagnet and the displacement sensor are both electrically connected to the controller, the displacement sensor is configured to acquire a displacement of the telescopic rod housing in real time and transmit the displacement to the controller, and the controller is configured to control the second electromagnet to be energized according to the displacement to solidify the second magnetorheological fluid to make the workpiece to be clamped stay at a set position.

Optionally, the elastic telescopic rod further includes a spring, one end of the spring is connected to a top end of the sliding rod, and the other end of the spring is connected to an inner wall of the telescopic rod housing.

Optionally, the elastic telescopic rod further includes a spring support frame, the spring support frame is connected to the top end of the sliding rod, and the spring support frame is configured to support the spring.

Optionally, the magnetorheological intelligent fixture for grinding further includes an acquisition card, the controller, the pressure transmitter and the displacement sensor are all electrically connected to the acquisition card; and the acquisition card is configured to acquire the clamping force measured by the pressure transmitter and the displacement measured by the displacement sensor, and transmit the clamping force and the displacement to the controller.

Optionally, the magnetorheological intelligent fixture for grinding further includes a water pipe, and the water bladder is communicated with the water pump and the pressure transmitter respectively through the water pipe.

Optionally, the magnetorheological intelligent fixture for grinding further includes a valve, the valve is disposed on the water pipe, and the water pump is communicated with the water pipe through the valve.

Optionally, the elastic telescopic rod includes an elastic supporting telescopic rod and an elastic positioning telescopic rod, the elastic positioning telescopic rod is configured to support a workpiece positioning point of the workpiece to be clamped, so as to position the workpiece to be clamped, and the elastic supporting telescopic rod is configured to support the part of the workpiece to be clamped except the workpiece positioning point.

Optionally, the quantity of the elastic positioning telescopic rod is 1.

Optionally, the quantity of the elastic supporting telescopic rods is 16.

Compared with the prior art, the present disclosure has the following beneficial effects:

The present disclosure provides a magnetorheological intelligent fixture for grinding. By disposing the first magnetorheological fluid, the water bladder, the pressure transmitter, the controller, and the elastic telescopic rod, the workpiece is preliminary positioned and clamped by using the water bladder and the elastic telescopic rod, the clamping force is measured by using the pressure transmitter, and then the workpiece is surrounded by solidifying the first magnetorheological fluid to secondarily clamp the workpiece, thereby ensuring that the workpiece is not loosened and deformed when being clamped.

BRIEF DESCRIPTION OF THE DRAWINGS

In order to illustrate the technical solutions in the embodiments of the present disclosure or the prior art more clearly, the drawings that need to be used in the descriptions of the embodiments or the prior art will be briefly introduced below. Obviously, the drawings in the following descriptions are merely some embodiments of the present disclosure. For a person of ordinary skill in the art, other drawings may be obtained according to these drawings without creative work.

DESCRIPTION OF NUMERALS

1—container, 2—water bladder, 3—water pipe, 4—pressure transmitter, 5—valve, 6—water tank, 7—base, 8—first electromagnet, 9—DC power supply, 10—controller, 11—acquisition card, 12—first magnetorheological fluid, 13—elastic supporting telescopic rod, 14—elastic positioning telescopic rod, 15—water pump, 16—telescopic rod housing, 17—second magnetorheological fluid, 18—second electromagnet, 19—displacement sensor, 20—sliding rod, 21—spring support frame, and 22—spring.

DETAILED DESCRIPTION OF THE EMBODIMENTS

The technical solutions in the embodiments of the present disclosure will be clearly and completely described below with reference to the accompanying drawings in the embodiments of the present disclosure. Obviously, the embodiments described are merely a part of the embodiments of the present disclosure, not all the embodiments. Based on the embodiments of the present disclosure, all other embodiments obtained by a person of ordinary skill in the art without creative work shall fall within the protection scope of the present disclosure.

In order to make the objectives, features and advantages of the present disclosure clearer and more understandable, the present disclosure will be described in further detail below in conjunction with the drawings and specific implementations.

Figure 1:
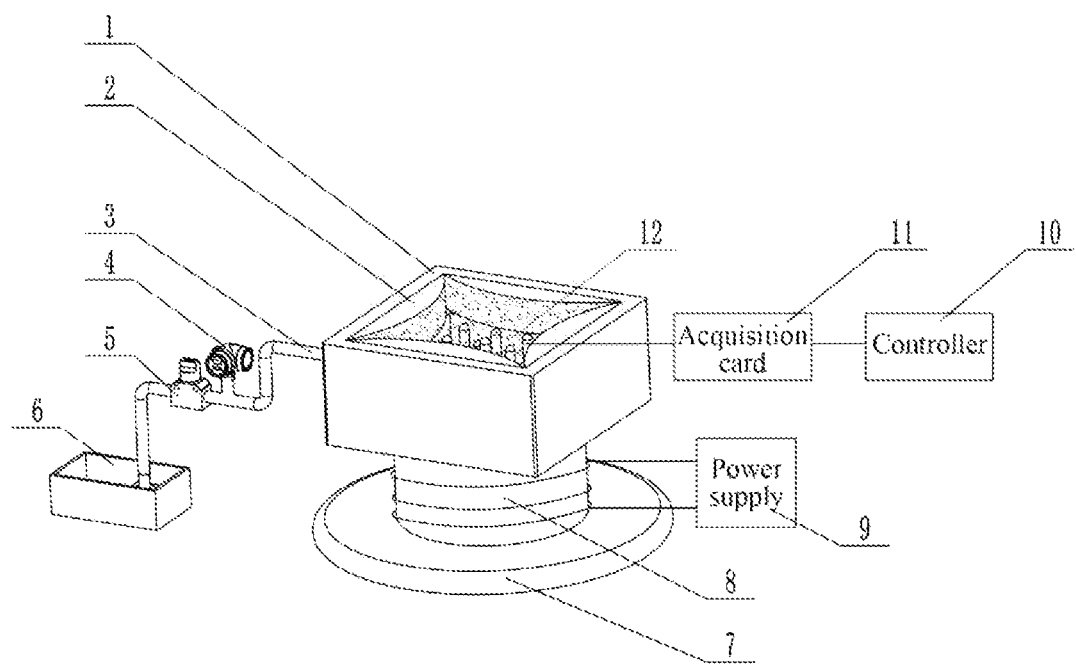
FIG. 1 is a schematic structural diagram of a magnetorheological intelligent fixture for grinding according to an embodiment of the present disclosure.
Figure 2:
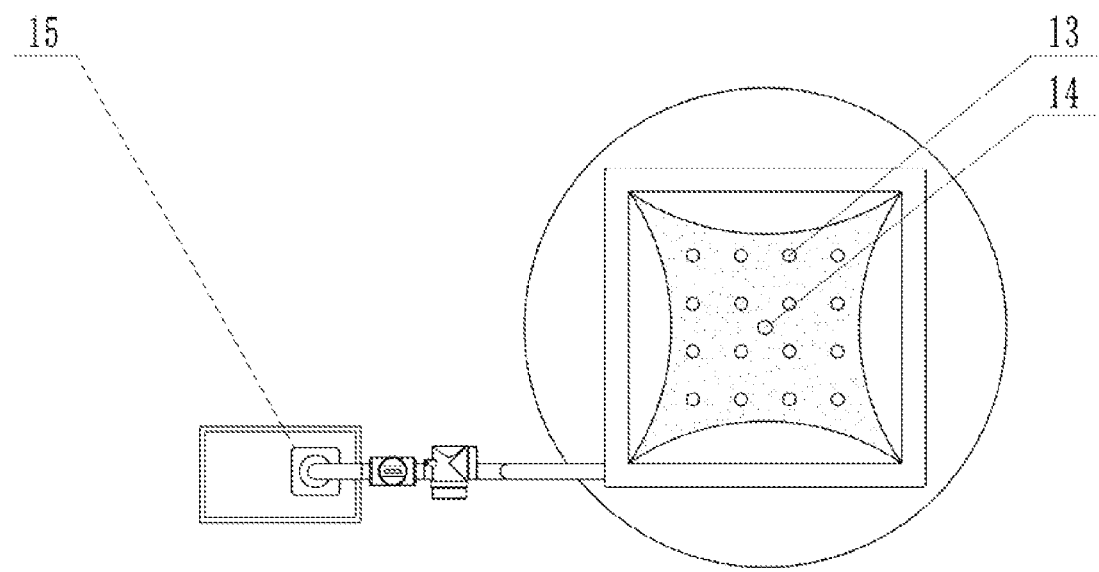
FIG. 2 is a top view of a magnetorheological intelligent fixture for grinding according to an embodiment of the present disclosure.

As shown in FIG. 1-FIG. 2, a magnetorheological intelligent fixture for grinding includes: a container 1, a water bladder 2, a pressure transmitter 4, a water pump 15, a first electromagnet 8, a controller 10, and an elastic telescopic rod.

The container 1 contains a first magnetorheological fluid 12. The elastic telescopic rod is disposed at a bottom of the container 1. Each side wall of the container 1 is provided with the water bladder 2. The water bladders 2 are mutually communicated. The water bladders 2 are respectively communicated with the pressure transmitter 4 and the water pump 15. The water pump 15 is connected to the water tank 6. The workpiece to be clamped is disposed on a top of the elastic telescopic rod. The container 1 is disposed above the first electromagnet 8. The first electromagnet 8, the pressure transmitter 4, and the water pump 15 are all electrically connected to the controller 10. The elastic telescopic rod is configured to position and support the workpiece to be clamped. The controller 10 is configured to control the water pump 15 to pressurize the water bladder 2 to pre-clamp the workpiece to be clamped. The pressure transmitter 4 is configured to measure a clamping force of the water bladder 2 on the workpiece to be clamped and transmit the clamping force to the controller 10. The controller 10 is also configured to control the first electromagnet 8 to be energized according to the clamping force to solidify the first magnetorheological fluid 12 to clamp the workpiece to be clamped.

As an optional embodiment, the container 1 has 4 side walls. There are 4 water bladders 2, and the 4 water bladders 2 are internally communicated.

Figure 3:
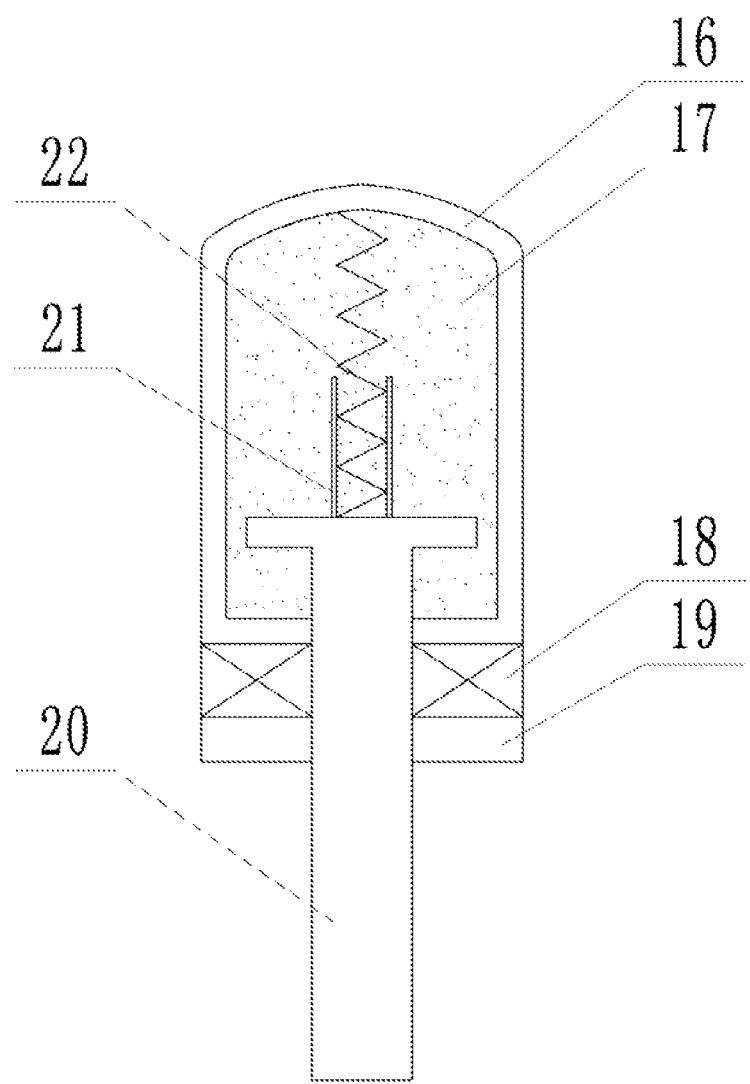
FIG. 3 is a schematic structural diagram of an elastic telescopic rod of a magnetorheological intelligent fixture for grinding according to an embodiment of the present disclosure.

As shown in FIG. 3, as an optional embodiment, the elastic telescopic rod includes: a telescopic rod housing, a second electromagnet 18, a sliding rod 20, and a displacement sensor 19. The sliding rod 20 is disposed at a bottom end of the container 1. The workpiece to be clamped is disposed at a top end of the telescopic rod housing. The telescopic rod housing is disposed at a top end of the sliding rod 20. The telescopic rod housing and the sliding rod 20 form a closed space. A second magnetorheological fluid 17 is provided in the closed space. The telescopic rod housing can slide up and down through the sliding rod 20, and the workpiece to be clamped will slide along with the telescopic rod housing. The second electromagnet 18 and the displacement sensor 19 are both disposed on the telescopic rod housing. The second electromagnet 18 and the displacement sensor 19 are both electrically connected to the controller 10. The displacement sensor 19 is configured to acquire a displacement of the telescopic rod housing in real time, and transmit the displacement to the controller 10. The controller 10 is configured to control the second electromagnet 18 to be energized according to the displacement to solidify the second magnetorheological fluid 17 to make the workpiece to be clamped stay at a set position.

As an optional implementation, the second electromagnet 18 is disposed below the telescopic rod housing. The second electromagnet 18 is connected to the displacement sensor 19.

As an optional implementation, the elastic telescopic rod further includes a spring 22, one end of the spring 22 is connected to the top end of the sliding rod 20, and the other end of the spring 22 is connected to an inner wall of the telescopic rod housing.

As an optional implementation, the elastic telescopic rod further includes a spring support frame 21, the spring support frame 21 is connected to the top end of the sliding rod 20, and the spring support frame 21 is configured to support the spring 22.

As an optional implementation, the magnetorheological intelligent fixture for grinding further includes an acquisition card 11. The controller 10, the pressure transmitter 4, and the displacement sensor 19 are all connected to the acquisition card 11. The acquisition card 11 is configured to acquire a clamping force measured by the pressure transmitter 4 and a displacement measured by the displacement sensor 19, and transmit the clamping force and the displacement to the controller 10.

As an optional implementation, the magnetorheological intelligent fixture for grinding further includes a water pipe 3. The water bladder 2 is communicated with the water pump 15 and the pressure transmitter respectively through the water pipe 3.

As an optional implementation, the magnetorheological intelligent fixture for grinding further includes a valve 5. The valve 5 is disposed on the water pipe 3, and the water pump 15 is communicated with the water pipe 3 through the valve 5. The controller 10 is electrically connected to the valve 5, and the controller 10 is configured to control opening and closing of the valve 5.

As an optional implementation, the elastic telescopic rod includes an elastic supporting telescopic rod and an elastic positioning telescopic rod 14. The elastic positioning telescopic rod 14 is configured to support a workpiece positioning point of the workpiece to be clamped to position the workpiece to be clamped. The elastic supporting telescopic rod 13 is configured to support the part of the workpiece to be clamped except the workpiece positioning point.

As an optional implementation, the quantity of the elastic supporting telescopic rod 14 is 1, and the elastic supporting telescopic rod is disposed at a center position of a bottom end of the container 1.

As an optional implementation, the quantity of the elastic supporting telescopic rods 13 is 16. The elastic supporting telescopic rods are arranged in a form of 4×4.

As an optional implementation, a base 7 is further included. The first electromagnet 8 is disposed above the base 7.

The first electromagnet 8 and the second electromagnet 18 are both iron cores wound with coils. The coil is connected to a DC power source 9. The DC power source 9 is electrically connected to the controller 10. The controller 10 is configured to control the DC power supply 9 to supply power to the first electromagnet 8 and the second electromagnet 18.

The working principle of the elastic telescopic rod is as follows:

When the second electromagnet is not energized, the second magnetorheological fluid is in a liquid state. When the elastic telescopic rod is not under force, the spring supports the telescopic rod housing at a default position. When an upper end of the telescopic rod housing is under pressure, the telescopic rod housing can slide up and down according to force conditions. When the workplace at the upper end of the elastic telescopic rod is in place, the second electromagnet is energized, a magnetic field generated by the second electromagnet passes through the second magnetorheological fluid, the second magnetorheological fluid is solidified, the telescopic rod housing is fixed, and the elastic telescopic rod plays a role of locking. When the telescopic rod housing slides, the displacement sensor fixedly connected to the telescopic rod housing can slide together therewith, and the displacement sensor detects the displacement of the telescopic rod housing in real time and feedbacks the same to the acquisition card.

According to structures designed and size factors, the quantity of the elastic supporting telescopic rods and the quantity of the elastic positioning telescopic rods can be freely selected. In the present disclosure, the 16 elastic supporting telescopic rods and 1 positioning telescopic rod are not specifically stipulated.

The use process of the magnetorheological intelligent fixture for grinding when grinding the workpiece to be processed is specifically as follows:

Step 1: The workpiece positioning point pre-set for the workpiece to be processed is set on the elastic positioning telescopic rod in a center inside the container, and other positions except the workpiece positioning point are set on the elastic supporting telescopic rod.

Step 2: The workpiece to be processed is manually pressed to lower to a suitable position, such that about half of the workpiece to be processed is inside the container, then the second magnetorheological fluid of the elastic telescopic rod is energized to lock the elastic telescopic rod, and the position and posture of the workpiece is feedback by the displacement sensor to the controller through the acquisition card.

Step 3: The clamping force is set in the controller, the water pump is started, and the valve is opened to pressurize the water bladder.

Step 4: When the water bladder expands and gradually clamps the workpiece, the clamping force can be read through the pressure transmitter. After clamping, the DC power supply is turned on to energize the first electromagnet to solidify the first magnetorheological fluid to secondarily clamp the workpiece, which better prevent the workpiece from move in other directions during processing.

Step 5: When the water bladder reaches a set pressure value, hands pressing on the workpiece are released, and at this moment, the water bladder transfers the pressure to the solidified second magnetorheological fluid to complete the clamping of the workpiece.

Step 6: The upper surface of the workpiece is wiped and cleaned.

Step 7: Grinding is started.

Step 8: After grinding and processing one surface of the workpiece, the water pump is controlled by the controller to stop and release the pressure, and the first electromagnet is deenergized.

Step 9: The second electromagnet of the elastic telescopic rod is controlled by the controller to be deenergized, and the telescopic rod housing is reset.

Step 10: The workpiece is taken out.

After turning the workpiece over, steps 1 to 9 are repeated to complete the grinding of the other surface. After all surfaces are processed, the processing of the workpiece is finished.

The present disclosure has the following advantages:

1. It is applicable to clamp workpieces with different surface types.

2. The clamping force can be adjusted by adjusting a water pressure of the water bladder to ensure that the workpiece is not loosened and deformed when being clamped.

3. The magnetic field generated by the first electromagnet can be changed by adjusting an intensity of the magnetic field to control a voltage of the first electromagnet. The degree of solidification of the first magnetorheological fluid is different under different magnetic fields, and a clamping friction force of the first magnetorheological fluid on the workpiece is also different.

4. The position and posture of the workpiece can be accurately measured by the displacement sensor.

The various embodiments in the specification are described progressively, and each embodiment mainly illustrates the differences from other embodiments, and the same or similar parts between the various embodiments can be referred to each other.

Specific examples are used herein to illustrate the principle and implementation of the present disclosure. The descriptions of the forgoing embodiments are only configured to assist in understanding the method and core idea of the present disclosure. At the same time, for a person of ordinary skill in the art, according to the idea of the present disclosure, there will be changes in the specific implementations and the scope of application. In summary, the content of this specification should not be construed as a limitation to the present disclosure.

What is claimed is:

1. A magnetorheological intelligent fixture for grinding, comprising: a container, a water bladder, a pressure transmitter, a water pump, a first electromagnet, a controller, and an elastic telescopic rod, wherein
the container contains a first magnetorheological fluid; the elastic telescopic rod is disposed at a bottom of the container, each side wall of the container is provided with the water bladder, the water bladders are mutually communicated, the water bladders are respectively connected to the pressure transmitter and the water pump, and the water pump is connected to the water tank; a workpiece to be clamped is disposed on a top of the elastic telescopic rod; the container is disposed above the first electromagnet; the first electromagnet, the pressure transmitter, and the water pump are all electrically connected to the controller; and the elastic telescopic rod is configured to position and support the workpiece to be clamped, the controller is configured to control the water pump to pressurize the water bladder to pre-clamp the workpiece to be clamped, the pressure transmitter is configured to measure a clamping force of the water bladder on the workpiece to be clamped and transmit the clamping force to the controller, and the controller is also configured to control the first electromagnet to be energized according to the clamping force to solidify the first magnetorheological fluid to clamp the workpiece to be clamped.

2. The magnetorheological intelligent fixture for grinding according to claim 1, wherein the elastic telescopic rod comprises: a telescopic rod housing, a second electromagnet, a sliding rod, and a displacement sensor; the sliding rod is disposed at a bottom end of the container; the workpiece to be clamped is disposed at a top end of the telescopic rod housing; the telescopic rod housing is disposed at a top end of the sliding rod, the telescopic rod housing and the sliding rod form a closed space, a second magnetorheological fluid is provided in the closed space, the sliding rod can slide up and down through the telescopic rod housing, and the workpiece to be clamped will slide along with the telescopic rod housing; and the second electromagnet and the displacement sensor are both disposed on the telescopic rod housing, the second electromagnet and the displacement sensor are both electrically connected to the controller, the displacement sensor is configured to acquire a displacement of the telescopic rod housing in real time and transmit the displacement to the controller, and the controller is configured to control the second electromagnet to be energized according to the displacement to solidify the second magnetorheological fluid to make the workpiece to be clamped stay at a set position.

3. The magnetorheological intelligent fixture for grinding according to claim 2, wherein the elastic telescopic rod further comprises a spring, one end of the spring is connected to the top end of the sliding rod, and the other end of the spring is connected to an inner wall of the telescopic rod housing.

4. The magnetorheological intelligent fixture for grinding according to claim 3, wherein the elastic telescopic rod further comprises a spring support frame, the spring support frame is connected to the top end of the sliding rod, and the spring support frame is configured to support the spring.

5. The magnetorheological intelligent fixture for grinding according to claim 2, further comprising an acquisition card, wherein the controller, the pressure transmitter, and the displacement sensor are all electrically connected to the acquisition card; and the acquisition card is configured to acquire the clamping force measured by the pressure transmitter and the displacement measured by the displacement sensor, and transmit the clamping force and the displacement to the controller.

6. The magnetorheological intelligent fixture for grinding according to claim 1, further comprising a water pipe, wherein the water bladder is communicated with the water pump and the pressure transmitter respectively through the water pipe.

7. The magnetorheological intelligent fixture for grinding according to claim 6, further comprising a valve, wherein the valve is disposed on the water pipe, and the water pump is communicated with the water pipe through the valve.

8. The magnetorheological intelligent fixture for grinding according to claim 1, wherein the elastic telescopic rod comprises at least one elastic supporting telescopic rod and an elastic positioning telescopic rod, the elastic positioning telescopic rod is configured to support a workpiece positioning point of the workpiece to be clamped, so as to position the workpiece to be clamped, and the at least one elastic supporting telescopic rod is configured to support a part of the workpiece to be clamped except at the workpiece positioning point.

9. The magnetorheological intelligent fixture for grinding according to claim 8, wherein the quantity of the elastic positioning telescopic rod is 1.

10. The magnetorheological intelligent fixture for grinding according to claim 8, wherein the quantity of the at least one elastic supporting telescopic rod is 16.

* * * * *